(12) United States Patent
Ertel

(10) Patent No.: US 7,866,163 B2
(45) Date of Patent: Jan. 11, 2011

(54) RADIOGRAPHIC DETECTOR DOCKING STATION WITH DYNAMIC ENVIRONMENTAL CONTROL

(75) Inventor: Jason R. Ertel, Waukesha, WI (US)

(73) Assignee: General Electric Company, Schenectady, NY (US)

(*) Notice: Subject to any disclaimer, the term of this patent is extended or adjusted under 35 U.S.C. 154(b) by 1568 days.

(21) Appl. No.: 10/711,759

(22) Filed: Oct. 4, 2004

(65) Prior Publication Data

US 2006/0070384 A1    Apr. 6, 2006

(51) Int. Cl.
*F25B 21/02*    (2006.01)
(52) U.S. Cl. .......................................... 62/3.2
(58) Field of Classification Search ................... 62/3.3, 62/3.6, 259.2
See application file for complete search history.

(56) References Cited

U.S. PATENT DOCUMENTS

| | | | |
|---|---|---|---|
| 5,103,092 A | | 4/1992 | Takahashi et al. |
| 5,235,191 A | * | 8/1993 | Miller ..................... 250/486.1 |
| 5,262,871 A | | 11/1993 | Wilder et al. |
| 5,281,803 A | | 1/1994 | Ishizuka |
| 5,331,166 A | * | 7/1994 | Crosetto et al. ........ 250/370.11 |
| 5,508,740 A | | 4/1996 | Miyaguchi et al. |
| 5,514,873 A | | 5/1996 | Schulze-Ganzlin et al. |
| 5,608,774 A | | 3/1997 | Polichar et al. |
| 5,661,309 A | | 8/1997 | Jeromin et al. |
| 5,693,948 A | | 12/1997 | Sayed et al. |
| 5,715,292 A | | 2/1998 | Sayag et al. |
| 5,773,832 A | | 6/1998 | Sayed et al. |
| 5,811,790 A | | 9/1998 | Endo et al. |
| 5,828,726 A | | 10/1998 | Polichar et al. |
| 5,903,052 A | | 5/1999 | Chen et al. |
| 5,909,478 A | | 6/1999 | Polichar et al. |
| 5,962,856 A | | 10/1999 | Zhao et al. |
| 5,965,872 A | | 10/1999 | Endo et al. |
| 6,049,074 A | | 4/2000 | Endo et al. |
| 6,101,815 A | * | 8/2000 | van Oort et al. ................ 62/3.4 |
| 6,127,714 A | | 10/2000 | Mochizuki |
| 6,208,708 B1 | | 3/2001 | Hoheisel et al. |
| 6,232,607 B1 | | 5/2001 | Huang |
| 6,239,439 B1 | | 5/2001 | Itabashi et al. |

(Continued)

FOREIGN PATENT DOCUMENTS

JP    11271454    10/1999

(Continued)

*Primary Examiner*—Melvin Jones
(74) *Attorney, Agent, or Firm*—Ziolkowski Patent Solutions Group, SC

(57) ABSTRACT

A docking station for one or more x-ray detectors is disclosed and designed to secure an x-ray detector when not in use to limit exposure of an x-ray detector to drops, jars, and other potentially damaging incidents. The docking station may be equipped to regulate the temperature of a stored x-ray detector. Thermal regulation can be achieved passively or actively using convection, conduction, radiation, and other thermal transference principles. The docking station may also include an electronic interface that communicates with a stored x-ray detector such that thermal regulation may be achieved dynamically and responsively. The docking station may be free-standing or wall-mounted. The docking station may be remote from or integrated with an x-ray scanner. The docking station may also be equipped to charge/re-charge batteries of a stored x-ray detector.

26 Claims, 10 Drawing Sheets

U.S. PATENT DOCUMENTS

| | | |
|---|---|---|
| 6,255,638 B1 | 7/2001 | Eräluoto et al. |
| 6,323,891 B1 | 11/2001 | Kitani et al. |
| 6,331,705 B1 | 12/2001 | Eisen et al. |
| 6,333,963 B1 | 12/2001 | Kaifu et al. |
| 6,344,652 B1 | 2/2002 | Shoji |
| 6,370,881 B1 * | 4/2002 | Maydanich .................... 62/3.2 |
| 6,398,409 B1 | 6/2002 | Brooks |
| 6,459,132 B1 | 10/2002 | Mochizuki |
| 6,469,312 B2 | 10/2002 | Agano |
| 6,475,824 B1 | 11/2002 | Kim |
| 6,495,836 B1 * | 12/2002 | Hata ..................... 250/370.09 |
| 6,552,319 B2 | 4/2003 | Pyyhtiä et al. |
| 6,667,480 B2 | 12/2003 | Kajiwara |
| 6,700,126 B2 | 3/2004 | Watanabe |
| 6,707,880 B2 | 3/2004 | Yamayoshi |
| 6,714,623 B2 | 3/2004 | Sako et al. |
| 6,723,592 B2 | 4/2004 | Shih |
| 6,748,048 B2 * | 6/2004 | Dosho ......................... 378/79 |
| 2002/0005490 A1 | 1/2002 | Watanabe |
| 2002/0150214 A1 | 10/2002 | Spahn |
| 2002/0181659 A1 | 12/2002 | Watanabe et al. |
| 2003/0031296 A1 | 2/2003 | Hoheisel |

FOREIGN PATENT DOCUMENTS

| | | |
|---|---|---|
| JP | 2001099942 | 4/2001 |
| JP | 2001198116 | 7/2001 |
| JP | 2001224579 | 8/2001 |
| JP | 2002006049 | 1/2002 |
| JP | 2002014170 | 1/2002 |
| JP | 2002048873 | 2/2002 |
| JP | 2002125960 | 5/2002 |
| JP | 2002131437 | 5/2002 |
| JP | 2003000586 | 1/2003 |
| JP | 2003010175 | 1/2003 |
| JP | 2003014862 | 1/2003 |
| JP | 2003060181 | 2/2003 |
| JP | 2003334184 | 11/2003 |

* cited by examiner

RADIOGRAPHIC DETECTOR DOCKING STATION WITH DYNAMIC ENVIRONMENTAL CONTROL

BACKGROUND OF THE INVENTION

The present invention relates generally to diagnostic imaging and, more particularly, to a docking station that regulates the temperature of a stored detector.

X-ray imaging is a non-invasive technique to capture images of medical patients for clinical diagnosis as well as inspect the contents of sealed containers, such as luggage, packages, and other parcels. To capture these images, an x-ray source irradiates a scan subject with a fan beam of x-rays. The x-rays are then attenuated as they pass through the scan subject. The degree of attenuation varies across the scan subject as a result of variances in the internal composition of the subject. The attenuated energy impinges upon an x-ray detector designed to convert the attenuating energy to a form usable in image reconstruction. A control system reads out electrical charge stored in the x-ray detector and generates a corresponding image. For a conventional, screen film detector, the image is developed on a film and displayed using a backlight.

Increasingly, flat panel, digital x-ray detectors are being used to acquire data for image reconstruction. Flat panel detectors are generally constructed as having a scintillator, which is used to convert x-rays to visible light that can be detected by a photosensitive layer. The photosensitive layer includes an array of photosensitive or detection elements that each store electrical charge in proportion to the light that is individually detected. Generally, each detection element has a light sensitive region and a region comprised of electronics to control the storage and output of electrical charge. The light sensitive region is typically composed of a photoconductor, and electrons are released in the photoconductor when exposed to visible light. During this exposure, charge is collected in each detector element and is stored in a capacitor situated in the electronics region. After exposure, the charge in each detector element is read out using logic controlled electronics.

Each detector element is conventionally controlled using a transistor-based switch. In this regard, the source of the transistor is connected to the capacitor, the drain of the transistor is connected to a readout line, and the gate of the transistor is connected to a scan control interface disposed on the electronics in the detector. When negative voltage is applied to the gate, the switch is driven to an OFF state, i.e. no conduction between the source and drain. On the other hand, when a positive voltage is applied to the gate, the switch is turned ON resulting in connection of the source to the drain. Each detector element of the detector array is constructed with a respective transistor and is controlled in a manner consistent with that described below.

Specifically, during exposure to x-rays, negative voltage is applied to all gate lines resulting in all the transistor switches being driven to or placed in an OFF state. As a result, any charge accumulated during exposure is stored in each detector element capacitor. During read out, positive voltage is sequentially applied to each gate line, one gate at a time. In this regard, only one detector element is read out at a time. A multiplexer may also be used to support read out of the detector elements in a raster fashion. An advantage of sequentially reading out each detector element individually is that the charge from one detector element does not pass through any other detector elements. The output of each detector element is then input to a digitizer that digitizes the acquired signals for subsequent image reconstruction on a per pixel basis. Each pixel of the reconstructed image corresponds to a single detector element of the detector array.

As described above, indirect detection, digital x-ray detectors utilize a layer of scintillating material, such as Cesium iodide (CsI), to convert incident radiation to visible light that is detected by light sensitive regions of individual detector elements of a detector array. Generally, the transistor controlled detector elements are supported on a thin substrate of glass. The substrate, which supports the detector elements as well as the scintillator layer, is supported by a panel support. The panel support is not only designed to support the detector components, but also isolates the electronics that control the detector from the image detecting components. The electronics are supported by the panel support and enclosed by the back cover.

As described above, x-ray detectors have a multitude of electronic components. These electronic components are increasingly requiring more power to carry out the complex processes required for operation of the x-ray detector, e.g. data acquisition and data readout. These increased power requirements can expose the x-ray detector to increased thermal loads thereby resulting in "hot spots" on an external surface of the x-ray detector. As such, when a hot spot occurs, the x-ray detector must be removed from service and allowed to cool.

One proposed solution is to incorporate a fan in the x-ray detector that is designed to exhaust heated air to a cooler ambient. While such a solution may work in principle, as a medical device, an x-ray detector must remain sealed such that disinfectant and other sterilizing products can be applied without damaging the internal detector components. As such, designing the x-ray detector to have an exhaust port that would allow the ingress of cleaning agents is not practicable. Additionally, such an exhaust port would allow the ingress of dust and other fine particle debris that may interfere with operation of the x-ray detector.

Other proposed solutions include radiation and free convection; however, both are inadequate in responsively regulating the temperature of an x-ray detector. Since an x-ray detector has relatively little surface area, radiation losses are low and not rapid. Similarly, free convection does not remove a sufficient amount of heat to maintain the x-ray detector at a required temperature in a responsive manner. That is, x-ray detectors are iteratively placed in an in-use state and a non-use state. If a hot spot develops while the x-ray detector is in-use, the x-ray detector must be removed from use and allowed to cool. Free convection is capable of removing the heat but the time required to do so can be lengthy, resulting in considerable down-time of the x-ray detector. This can be problematic for high use facilities such as emergency rooms, triage centers, and the like where turnaround time can be critical to diagnosing a patient. The same criticality can be found in non-medical environments such as baggage screening at airports, postage facilities, etc.

Also, these proposed solutions are solely concerned with dissipating heat from an x-ray detector, not maintaining the temperature of the x-ray detector within a prescribed temperature range. It is well-recognized that the components of an x-ray detector operate more efficiently when the temperature of the components are maintained within a given range. Accordingly, there is a need to dynamically monitor the temperature of an x-ray detector when not in use and actively regulate the temperature of the detector to be within a given range. As such, when the x-ray detector is placed in use after a period of non-use, the time customarily required to heat-up to an optimal temperature is avoided thereby further reducing the down-time of the x-ray detector.

Therefore, it would be desirable to design an apparatus that stores an x-ray detector during x-ray detector non-use and regulates the temperature of a stored x-ray detector to enhance operability of the x-ray detector when the x-ray detector is removed from storage and placed in use.

BRIEF DESCRIPTION OF THE INVENTION

The present invention is directed to an x-ray detector docking station with thermal regulation of stored x-ray detectors that overcomes the aforementioned drawbacks.

A docking station for one or more x-ray detectors is disclosed and designed to secure an x-ray detector when not in use to limit exposure of an x-ray detector to drops, jars, and other potentially damaging incidents. Additionally, the docking station is equipped to regulate the temperature of a stored x-ray detector. Thermal regulation can be achieved passively or actively using convection, conduction, radiation, and other thermal transference principles. The docking station includes an electronic interface that communicates with a stored x-ray detector such that thermal regulation may be achieved dynamically and responsively. The docking station may be free-standing or wall-mounted. The docking station may be remote from or integrated with an x-ray scanner. The docking station may also be portable.

Therefore, according to one aspect, the present invention includes an x-ray detector storage device having a storage bin sized to store at least one x-ray detector. The storage device also has a temperature regulator configured to adjust a temperature of a stored x-ray detector to a desired temperature. In another aspect, the temperature regulator may adjust the temperature of a stored x-ray detector so as to take into account the surrounding relative humidity, such that condensation does not occur on the x-ray detector or the docking station components.

In accordance with another aspect, an x-ray detector storage apparatus is presented and includes a receptacle sized to receive an x-ray detector during non-use of the x-ray detector. The apparatus also has a temperature control interface connected to the receptacle and configured to provide feedback as to a temperature of an x-ray detector when the x-ray detector is disposed within the receptacle. A thermal exchange system is configured to regulate the temperature of an x-ray detector when the x-ray detector is disposed within the receptacle. The apparatus further includes a controller operationally connected to receive the feedback and control the thermal exchange system to reduce a difference between the temperature of an x-ray detector disposed in the receptacle and a desired temperature.

According to yet another aspect, the present invention includes an x-ray detector docking station having a storage bin sized to receive one or more flat panel x-ray detectors and an interface configured to receive temperature data from a flat panel x-ray detector disposed in the storage bin. The docking station further includes means for regulating a temperature of the flat panel x-ray detector based on temperature data received from the interface.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

The present invention will be described with respect to a flat panel, solid-state, indirect detection, and portable digital x-ray detector for use with a mobile x-ray imaging system. However, the present invention is equivalently applicable with other types of x-ray detectors including direct detection digital detectors. Additionally, the present invention may be used with stationary or fixed room x-ray imaging systems. Further, the present application makes reference to an imaging "subject" as well as an imaging "object". These terms are not mutually exclusive and, as such, use of the terms is interchangeable and is not intended to limit the scope of the appending claims.

Figure 1:
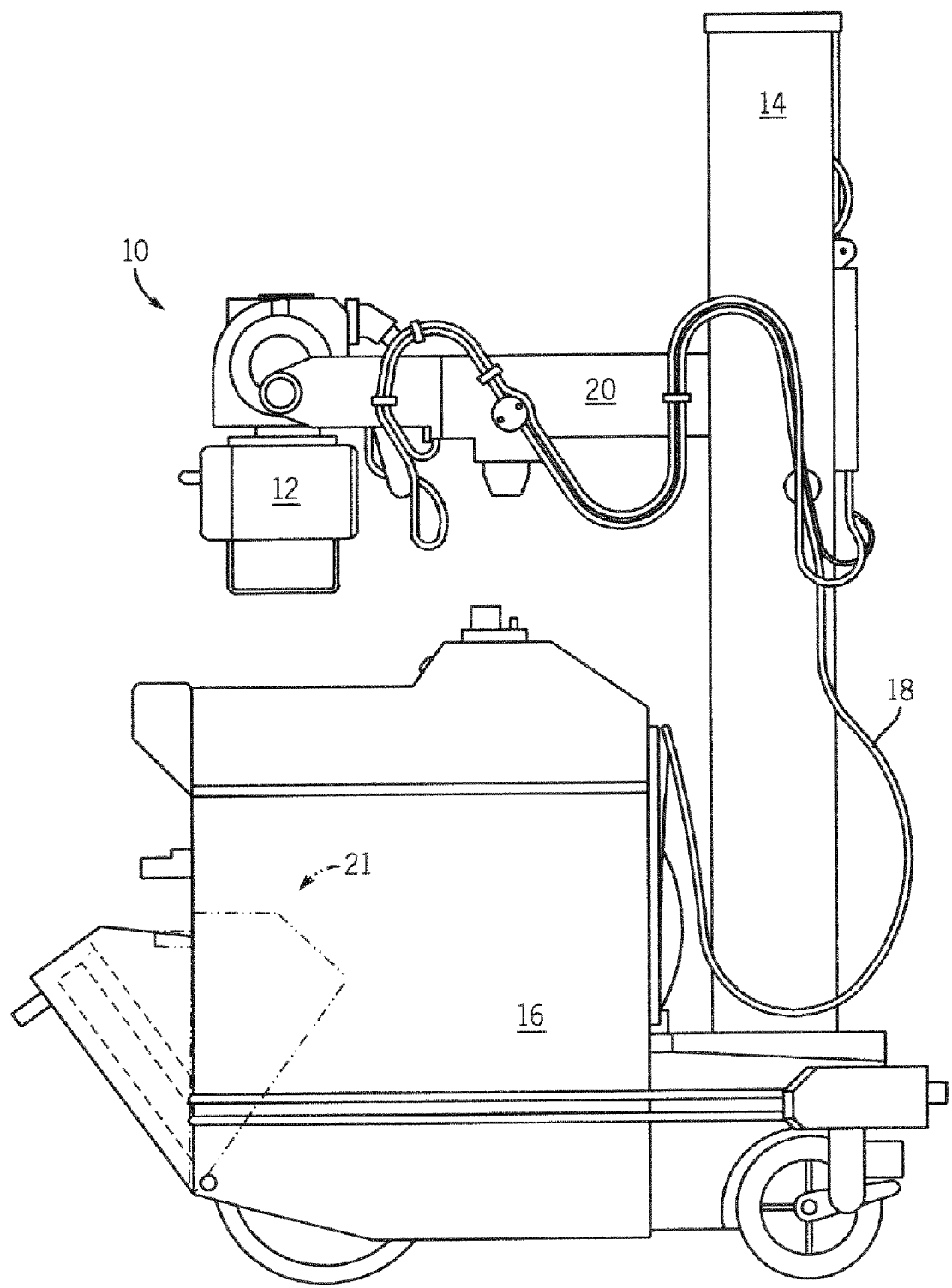
FIG. 1 is a pictorial view of an exemplary mobile x-ray imaging system.

Referring now to FIG. 1, an exemplary mobile x-ray imaging system 10 applicable with a portable x-ray detector incorporating the present invention is shown. An x-ray source 12 is mounted or otherwise secured to an end of horizontal arm 20. Arm 20 allows the x-ray source 12 to be variably positioned above a subject in such a manner so as to optimize irradiation of a particular area of interest. The x-ray source 12 is typically mounted through a gimbal type arrangement (not shown) in column 14. In this regard, the x-ray source may be rotated vertically from a rest or park position on the mobile x-ray unit base 16 to the appropriate position above the subject in order to take an x-ray exposure of the subject. The rotational movement of column 14 is typically limited to a value of 360 degrees or less to prevent entanglement of high voltage cables 18 used to provide electrical power to the x-ray source 12. Cables 18 may be connected to a utility line source (not shown) or a battery (not shown) in the base 16 to energize the x-ray source 12 as well as other electronic components of the system 10. One skilled in the art will appreciate that system 10 may be equipped or connectable to a display unit (not shown) for the display of images captured from the imaging subject. As will be described more fully below, the mobile system may include a retractable storage bin 21 for storage of an x-ray detector within base 16. The storage bay may also be constructed to regulate the temperature of the stored x-ray detector using passive as well as active thermal control techniques. While only a single stored x-ray detector is shown, it is contemplated that the storage bin may be sized to hold multiple x-ray detectors. Additionally, it is preferred that the storage bin snuggly receive each x-ray detector to limit movement, vibration, stresses, and the like on the stored x-ray detector when the x-ray scanner is being transported. In this regard, the storage bin may include foam or other deformable material to receive an x-ray detector in a tightly fashion as well dampen any force that may otherwise be placed on a stored detector when the x-ray scanner is jarred.

Figure 2:
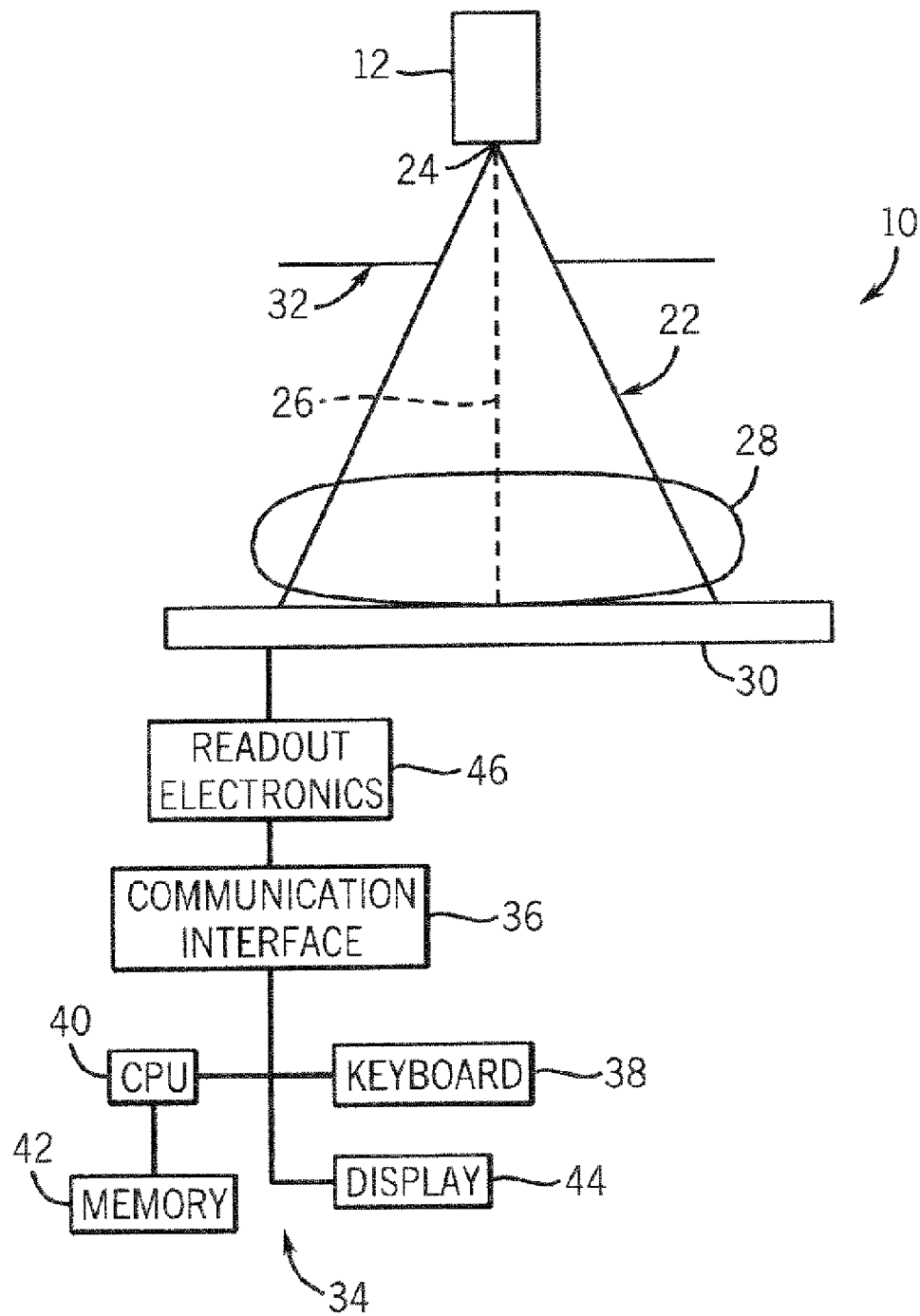
FIG. 2 is a schematic block diagram of the exemplary x-ray imaging system shown in FIG. 1.

Referring now to FIG. 2, a schematic of x-ray imaging system 10 is illustrated. As referenced above, system 10 includes x-ray source 12 designed to project a fan bean of irradiation 22 from focal spot 24 along axis 26 toward an object to be imaged 28. One skilled in the art will appreciate that medical patients as well as luggage, packages, and the like may be non-invasively inspected using the exemplary x-ray imaging system 10. A flat panel digital detector 30 detects x-rays passing through and attenuated by object 28. A collimator assembly 32, schematically shown in FIG. 2 as comprising collimator blades, may be used to collimate the x-ray fan beam 22 to control the scope of irradiation.

A host or scanner interface 34 includes a communication interface 36, a keyboard 38 or other data entry device, a CPU 40, memory 42, and a display unit 44, such a computer monitor, to display reconstructed images of the object. A bus 46 connects the keyboard 38, CPU 40, memory 42, and display unit 44 to the communication interface 36. The CPU may include a microprocessor, digital signal processor, microcontroller, as well as other devices designed to carry out logic and processing operations. Signals corresponding to an x-ray image are read out from flat panel detector 30 via readout electronics 46. While not shown, it is contemplated that the host interface 34 may be connected to a centralized facility via the Internet or communications link for monitoring and maintenance.

Additionally, the readout electronics may read out signals from the flat panel detector across a tethered connection between the detector and the imaging system. It is also contemplated that read out may be achieved across a wireless communication between the detector and imaging system. In this regard, one skilled in the art will appreciate that the imaging system and detector may be equipped with transceivers, antennas, and other operational circuitry to support the wireless transmission of data.

Figure 3:
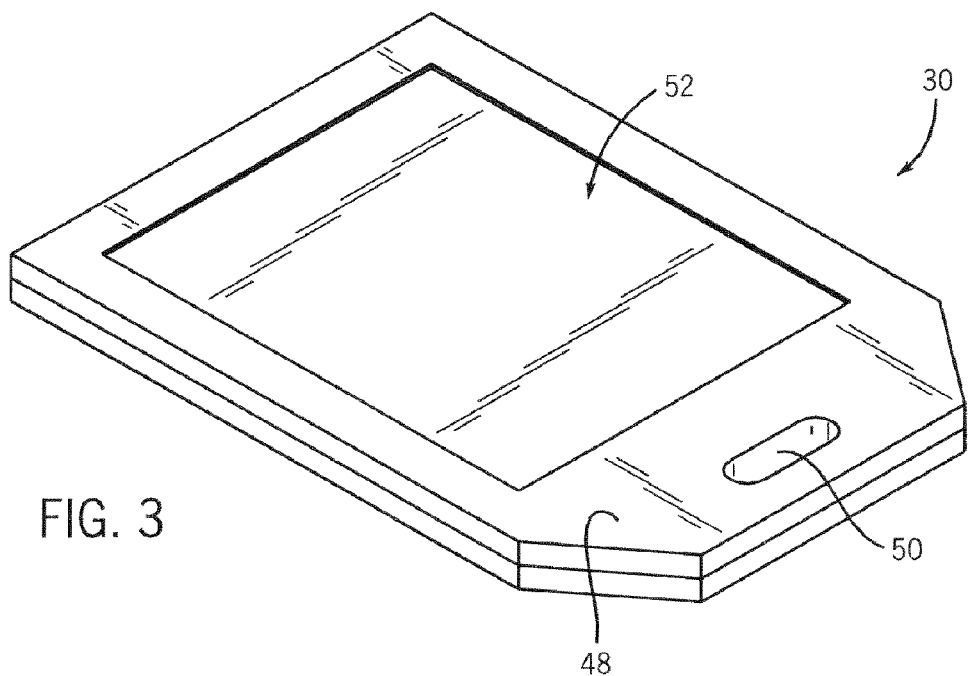
FIG. 3 is a perspective view of a portable, solid-state, flat panel, digital x-ray detector incorporating the present invention.

Referring now to FIG. 3, a perspective view illustrates a portable, flat panel x-ray detector 30 incorporating the present invention. Detector 30 is preferably an indirect detection, solid-state, digital detector that determines x-ray attenuation through an imaging subject from the emission of light by a scintillator that emits light upon the incidence of x-rays. The detector 30 includes a cover 48 formed of lightweight, durable composite material. A handle 50 is incorporated into the cover to support the portability of the detector. As shown, the detector 30 may be constructed without a fixed tether. In this regard, the detector may be connected to a tether (not shown), which is connected to the readout electronics when in use. When not in use, the detector may be easily detached from tether and stored remotely from the imaging system. The top of the cover includes a template 52 that visually defines the surface dimensions of the scintillator layer in the detector. Template 52 is designed to visually assist a user in positioning of the detector for data acquisition.

While the present invention is particularly applicable with indirect detection digital detectors, the present invention may also be implemented with direct detection digital detectors. Direct detection digital detectors utilize a layer of amorphous selenium or similar material photoconductor coupled to a thin film transistor array. X-ray interaction in the selenium layer releases electrons (or electron holes), which are used to form signal directly. An electrode is often used to create an electric field across the selenium layer to minimize the lateral spread of electrons, preserving spatial resolution. In addition to selenium, mercuric iodide, cadmium telluride, and lead iodide may be used.

Referring now to FIG. 1, an exemplary mobile x-ray imaging system 10, or generally, an "x-ray scanner", applicable with a portable x-ray detector incorporating the present invention is shown. An x-ray source 12 is mounted or otherwise secured to an end of horizontal arm 20. Arm 20 allows the x-ray source 12 to be variably positioned above a subject in such a manner so as to optimize irradiation of a particular area of interest. The x-ray source 12 is typically mounted through a gimbal type arrangement (not shown) in column 14. In this regard, the x-ray source may be rotated vertically from a rest or park position on the mobile x-ray unit base 16 to the appropriate position above the subject in order to take an x-ray exposure of the subject. The rotational movement of column 14 is typically limited to a value of 360 degrees or less to prevent entanglement of high voltage cables 18 used to provide electrical power to the x-ray source 12. Cables 18 may be connected to a utility line source (not shown) or a battery (not shown) in the base 16 to energize the x-ray source 12 as well as other electronic components of the system 10. One skilled in the art will appreciate that system 10 may be equipped or connectable to a display unit (not shown) for the display of images captured from the imaging subject. As will be described more fully below, the mobile system may include a retractable storage bin 21 for storage of an x-ray detector within base 16. The storage bay may also be constructed to regulate the temperature of the stored x-ray detector using passive as well as active thermal control techniques. While only a single stored x-ray detector is shown, it is contemplated that the storage bin may be sized to hold multiple x-ray detectors. Additionally, it is preferred that the storage bin snuggly receive each x-ray detector to limit movement, vibration, stresses, and the like on the stored x-ray detector when the x-ray scanner is being transported. In this regard, the storage bin may include foam or other deformable material to receive an x-ray detector in a tightly fashion as well dampen any force that may otherwise be placed on a stored detector when the x-ray scanner is jarred.

Top cover 54 and base cover 56 collectively form handle 50 when assembled. The handle supports portability of the detector. Additionally, the detector is constructed to be quickly detached from a tether (not shown) that is used to connect the detector to the scanner during data acquisition and readout. As such, detector 30 may be transported to and from multiple scan stations remote from one another. This is particularly advantageous for emergency rooms and other triage facilities. Further, the portability and detachability of the detector further enhances the mobility of a mobile x-ray imaging system, such as that shown in FIG. 1.

Detector 30 further includes a scintillator layer 58 designed to convert incident x-rays or gamma rays to visible light. Scintillator layer 58, which may be fabricated from CsI or other scintillating material, is designed to emit light proportional to the number and energy of the x-rays received. As such, light emissions will be higher in those regions of the scintillator layer 58 where either more x-rays were received or the energy level of the received x-rays was higher. Since the composition of the subject will attenuate the x-rays projected by the x-ray tube, the energy level of the x-rays impinging upon the scintillator layer will not be uniform across the scintillator layer. This variation in light emission will be used to capture contrast in the reconstructed image.

The light emitted by the scintillator layer 58 is detected by detector elements of a detector element array 60. Each detector element 62 corresponds to a picture element or pixel in the reconstructed image. Each detector element 62 includes a light sensitive or photoconductive region 64 and an electronics region 66. During exposure to x-rays, electrons are released in the light sensitive region 64 in proportion to the light detected in the region 64. The electronics region 66 includes a capacitor (not shown) that stores the electrical charge accumulated by the light sensitive region. After exposure, a thin-film-transistor (not shown) in the electronics region 66 is biased so as to connect the capacitor to readout electronics. Generally, a multiplexer (not shown) is used to control read out of the discrete detector elements in a sequential, raster fashion. In this regard, the output of each detector element is sequentially input to a digitizer for digitization for subsequent image reconstruction.

The thin-film-transistors of the detector elements 62 are supported by a glass substrate 68. Lead lines (not shown) etched in substrate 68 are used for routing of the electrical output of the detector elements as well as applying the biasing voltages to the thin-film-transistors. The glass substrate is generally very thin and fragile. In this regard, as referenced above, the top cover and base cover 54 and 56 are designed with impact absorbing material to help prevent fracturing of the glass substrate. Additionally, as the detector 30 may be used to support a relatively large load during imaging, e.g. imaging of the feet of an average sized adult male, the top cover panel 54 is further designed to reduce the stress on the detector to further prevent fracturing of the glass substrate and other detector components.

The glass substrate 68 is supported by a detector panel support 70. Panel support 70 is not only designed to support substrate 68, but is also used to separate the x-ray conversion and light detection components from the electronics 72. Panel support 70 is constructed to include radiation absorbing material in addition to structurally supporting material. Incorporating radiation absorbing material within the panel support reduces or eliminates the detection of backscattered x-rays. That is, the radiation absorbing material absorbs x-rays passing through the scintillator layer, detector element array, and glass substrate, as well as x-rays that deflect off the back cover of the detector. In this regard, the electronics 72 are not imaged.

Electronics 72, in one embodiment, have an L-shape and is disposed to support the processing and logic control electronics of the detector. The electronics preferably includes LEDs for monitoring operation and diagnostics of the detector. The motherboard may also include temperature sensors for providing feedback as to the temperature of the detector as well as the temperature of the subject. The electronics may also support an accelerometer designed to detect acceleration of the detector and store data accordingly. In this regard, the accelerometer may be used to record the date and time when the detector experienced dramatic increases in acceleration, i.e. when dropped. The electronics may also include various storage devices including flash storage. In a wireless implementation, the motherboard may include an antenna and transceiver for wirelessly transmitting data to the x-ray scanner. Additionally, the electronics may include a battery or other DC power source for powering the detector electronics. The electronics are supported by base cover panel 56.

As described above, the x-ray detector is designed to withstand relatively high-energy impacts, stresses, and strains such that the relatively sensitive components, i.e. scintillator layer, detector element array, glass substrate, and motherboard, are not damaged when the detector is dropped or stepped upon. In this regard, in one embodiment, the x-ray detector 30 includes two layers of impact-absorbing material 74, 76. One layer 74 is sealed against or otherwise placed in proximity to the undersurface of top cover panel 54 so as to be sandwiched between the top cover panel and scintillator layer 58. The other layer 76 is sealed or otherwise placed in proximity to the top surface of base panel 56 so as to be sandwiched between motherboard 72 and base panel 56. While two impact-absorbing layers 74, 76 are shown, it is contemplated that the detector may include only a single layer which is preferably sealed against the undersurface of top cover panel 54 or multiple layers interstitially disposed between the detector components. In this regard, the impact-absorbing material is designed not to attenuate radiation and, as such, does not interfere with data acquisition.

The impact-absorbing material is preferably a viscoelastic material that is designed to absorb the shock and vibrations placed on the detector when dropped but also deflect the force placed on the detector when stepped upon or otherwise subjected to a load, e.g. a standing patient for a foot/feet scan. In this regard, the impact absorbing material will deform when subjected to a load, but also recover its shape when the load is removed. As such, the impact-absorbing material has a memory.

The viscoelastic material, which may be foam or other plastic, is designed to deflect and absorb stresses and strains on the detector. As such, when the detector is stepped upon or dropped, the internal components of the detector, e.g. scintillator layer, detector element array, glass substrate, and motherboard, do not fracture or are otherwise damaged. One skilled in the art will appreciate that the thickness, density and composition of the impact-absorbing material may be variably selected to define the limits by which the detector may be subjected to a load or dropped without damage to the detector components. Preferably, however, the detector should have sufficient impact absorbing material such that the damage does not result when the detector is dropped a distance of 20 cm. and/or subjected to a point-load of 370 lbs.

Further, it is contemplated that layers 74 and 76 can have similar or dissimilar thicknesses, and be composed of similar or dissimilar impact absorbing material(s). For example, layer 74 may be designed to be more absorbent and deflective than layer 76. In this regard, layer 74 may be thicker than layer 76 or formed from material with improved absorption and deflective characteristics. Additionally, layer 74 may be formed of foam having pronounced viscoelastic properties whereas layer 76 is formed of a polycarbonate, PVC, or other material with less pronounced viscoelastic characteristics.

Figure 5:
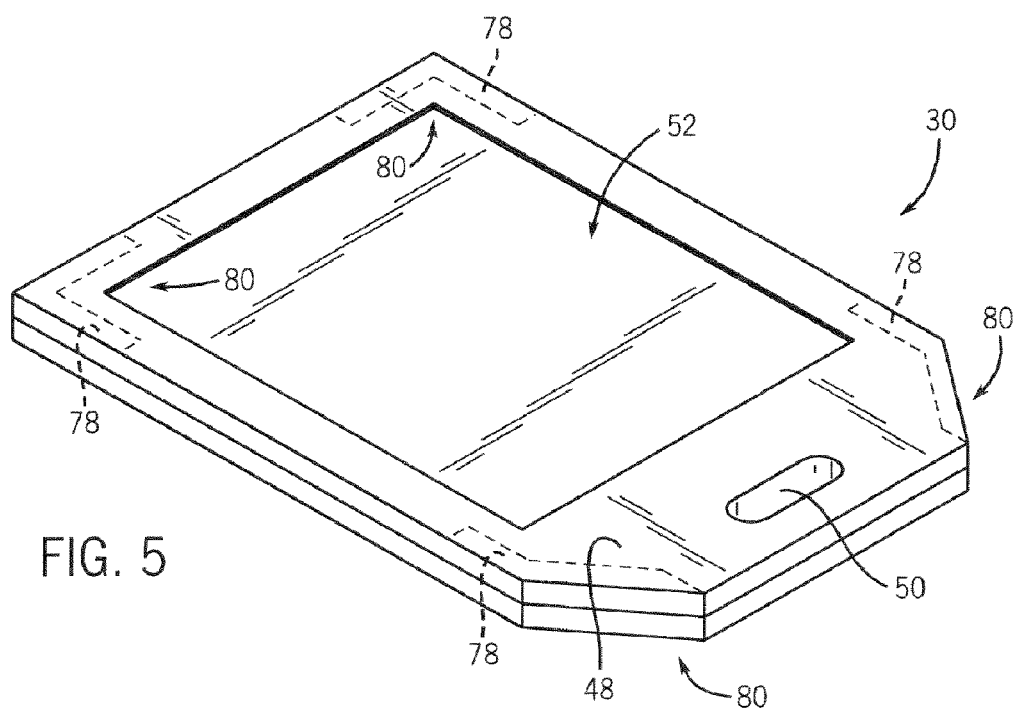
FIG. 5 is a perspective view of a portable, solid-state, flat panel, digital x-ray detector according to another embodiment of the present invention.

Referring now to FIG. 5, it is contemplated that the x-ray detector 30 may be constructed to have impact-absorbing inserts 78 placed in cavities positioned internally about the perimeter of the x-ray detector cover 48. The inserts may be positioned internally about the entire perimeter of the detector cover or, as illustrated in FIG. 5, positioned at identified impact zones 80. For example, inserts 78 may be positioned at each corner of the detector 30. Accordingly, when dropped, the detector is more likely to impact a floor or other surface at a corner. It is recognized that the detector may be constructed that its weight distribution increases the likelihood that that detector will impact the floor or other surface at a corner when dropped. By incorporating impact-absorbing material at the corners of the cover 48, the shock and resulting vibrations of the drop incident may be absorbed by the insert 78 and prevented from transferring to the internal components of the detector. It is recognized that the entirety of the shock may not be absorbed or otherwise deflected, but a sufficient percentage of the shock is absorbed such that any shock or vibration experienced by the internal components is of a magnitude insufficient to cause damage to the internal components. Additionally, by incorporating the inserts internally within the detector, the overall size and weight of the detector is negligibly increased, if any.

Figure 4:
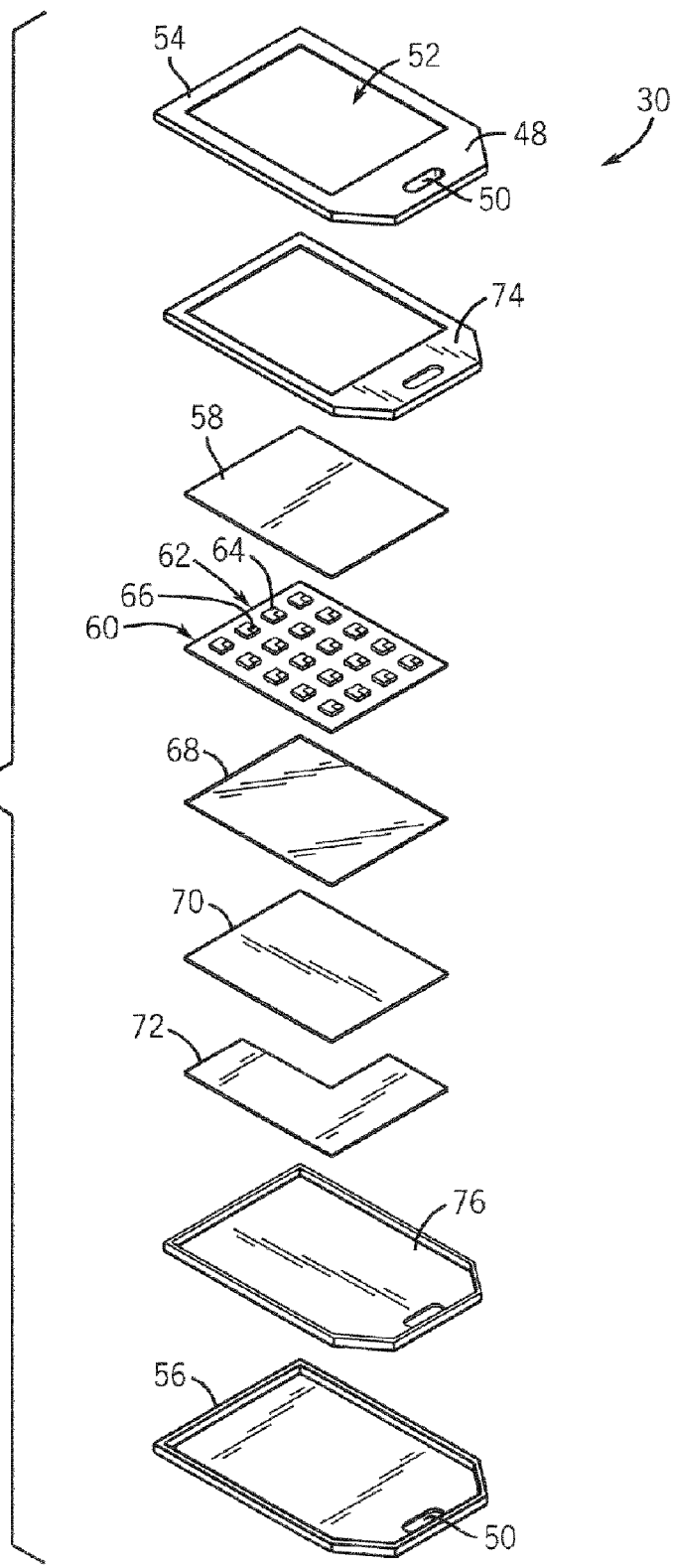
FIG. 4 is an exploded view of the x-ray detector shown in FIG. 3.

It is contemplated that the inserts 78 may be used in conjunction with a layer of impact-absorbing material positioned between the top cover and base panels and the internal components of the detector, such as that shown and described with respect to FIG. 4. In this regard, the layers of impact-absorbing material may be fabricated from materials with better deflective properties than impact absorption properties. On the other hand, the inserts 78 may be fabricated from materials having better impact absorption properties than deflective properties. As a result of this construction, the detector is able to handle greater point loads and greater impacts than that achieved with inserts or layers of impact absorbing material alone.

Figure 6:
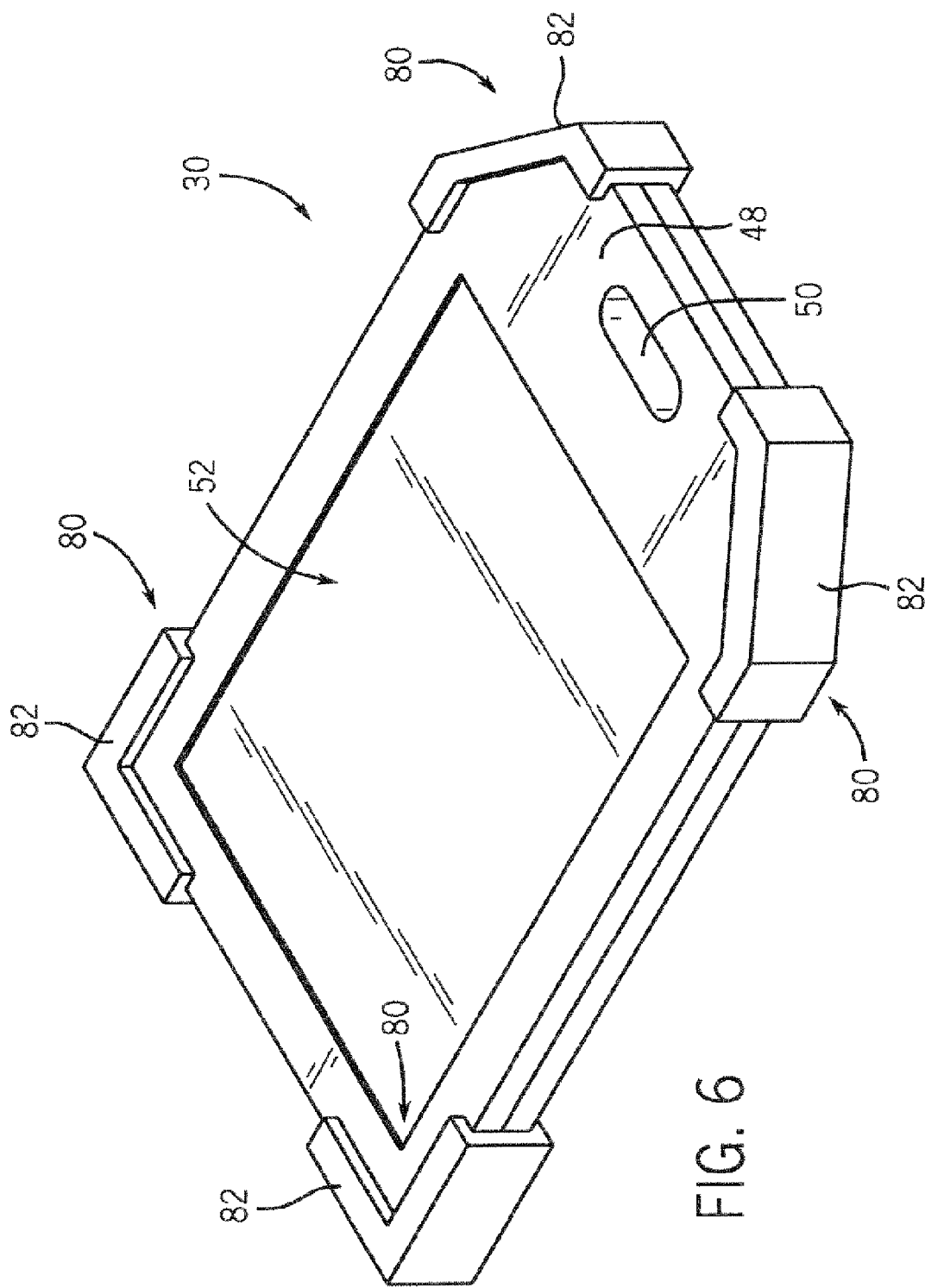
FIG. 6 is a perspective view of a portable, solid-state, flat panel, digital x-ray detector according to yet another embodiment of the present invention.

It is also contemplated that "bumpers" of impact-absorbing material may be secured, sealed, or otherwise connected to the external perimeter of the x-ray detector cover. This embodiment is illustrated in FIG. 6. As shown, bumpers 82 of impact absorbing material may be sealed against one or more corners of the detector cover 48. As the corners are identified as impact zones, the bumpers are shown at each corner. It is recognized that other impact zones may be identified around the perimeter of the cover 48 and, as such, receive a bumper. In this regard, it is contemplated that a continuous bumper may be sealed against the entire perimeter of the cover 48. In contrast to the embodiments described with respect to FIGS. 4 and 5, the bumpers 82 shown in FIG. 6 may increase the size of the detector. On the other hand, it is contemplated that the corners of the cover 48 may be replaced with bumpers 82 so as to not increase the size of the detector.

For instance, the cover 48 may be molded in such a manner that impact-absorbing material is used at the corners rather than the composite material used throughout the remainder of the cover. Or, cover 48 may be initially constructed without corners whereupon properly shaped wedges of impact-absorbing material may be glued or otherwise sealed to the cover so as to fill in the voids defined at the corners. Further, similar to the embodiment illustrated in FIG. 5, the detector of FIG. 6 may be constructed to include impact-absorbing material at selected impact zones as well as layers of impact-absorbing material such as that shown in FIG. 4.

Figure 7:
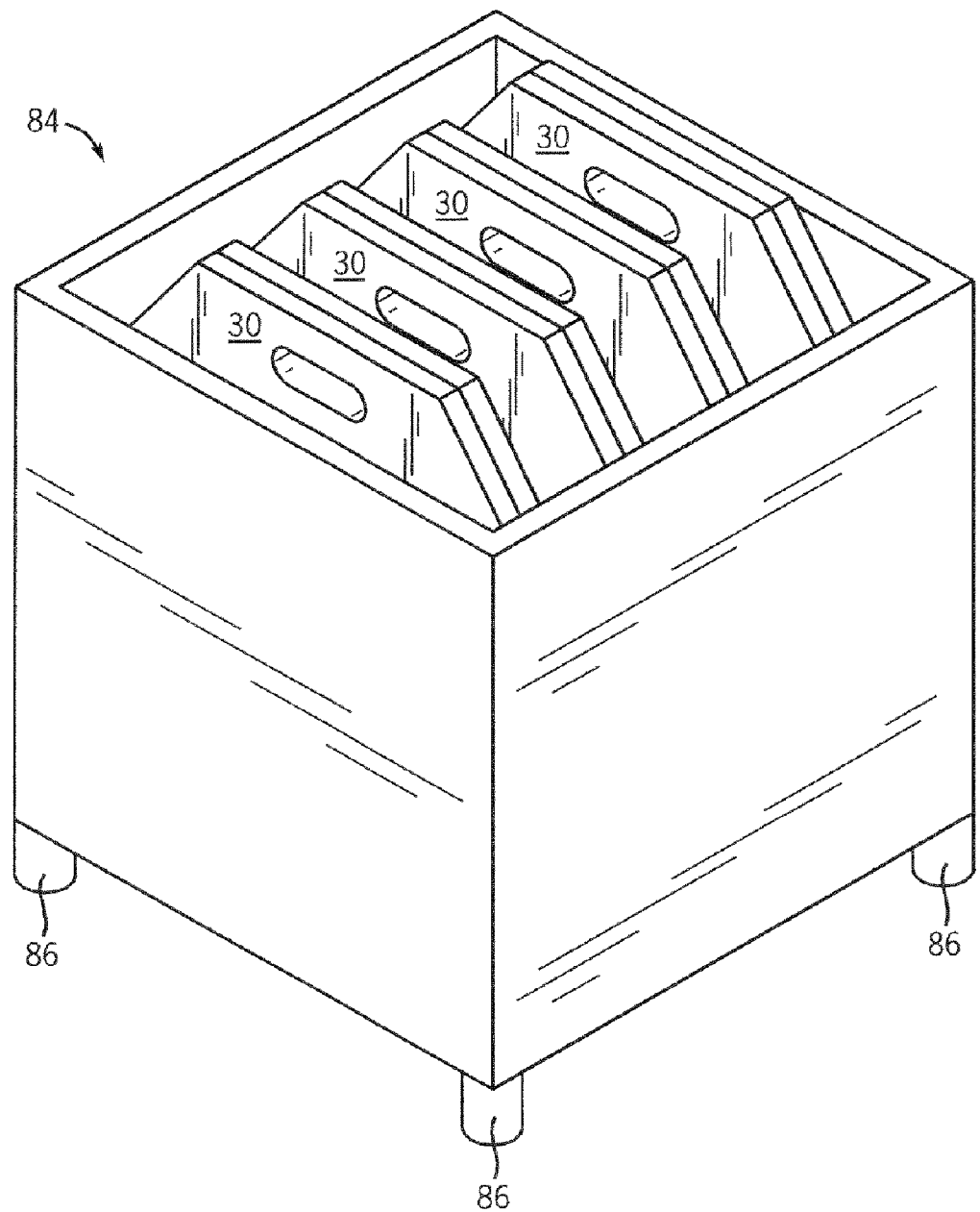
FIG. 7 is perspective view of an x-ray detector docking station according to the present invention.

Referring now to FIG. 7, a docking station 84 for an x-ray detector is shown. The docking station 84 illustrated is sized to store multiple x-ray detectors 30; however, it is contemplated that the docking station may be designed to hold a single x-ray detector. Docking station 84 may be free-standing and, as such, include legs 86 or mounted on a wall or other structure (not shown) in a customary manner. The docking station is a dual purpose apparatus as it designed to store x-ray detectors while they are not in use, and includes a thermal exchanger and control to regulate the temperature of the stored x-ray detectors. As will be described, it is contemplated that thermal regulation of stored x-ray detectors may be achieved in accordance with the principles of radiation, conduction, convection, or a combination thereof.

Figure 8:
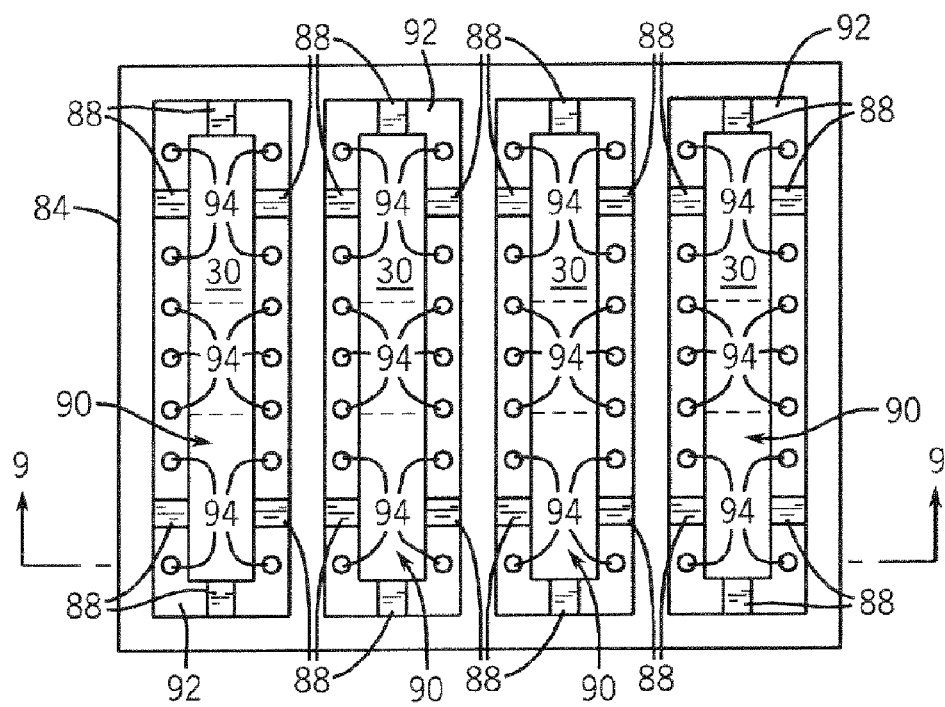
FIG. 8 is a top view of the x-ray detector docking station illustrated in FIG. 7.

Referring now to FIG. 8, a top view of docking station 84 illustrates alignment and storage of x-ray detectors 30 therein. In one embodiment, docking station 84 includes a plurality of ribs 88 that extend from the base 92 of the docking station 84 to define a plurality of receptacles 90, each sized to receive a single x-ray detector 30. The ribs 88 are preferably formed of a viscoelastic material or foam that directs placement of an x-ray detector 30 when being inserted into a receptacle 90 for storage without causing damage of the exterior to the x-ray detector 30. As will be described in greater detail below, the docking station includes a controller that interfaces with each x-ray detector. As such, each x-ray detector includes a pinned or socket connector that mates with a counterpart connector in the base of the docking station. To ease user connection of an x-ray detector to the docking station interface connector, ribs 84 are designed to define a channel that when the x-ray detector is placed therein, a connection between the x-ray detector and docking station is achieved relatively effortlessly and in a manner that can be repeated with each placement of an x-ray detector in the docking station.

Figure 9:
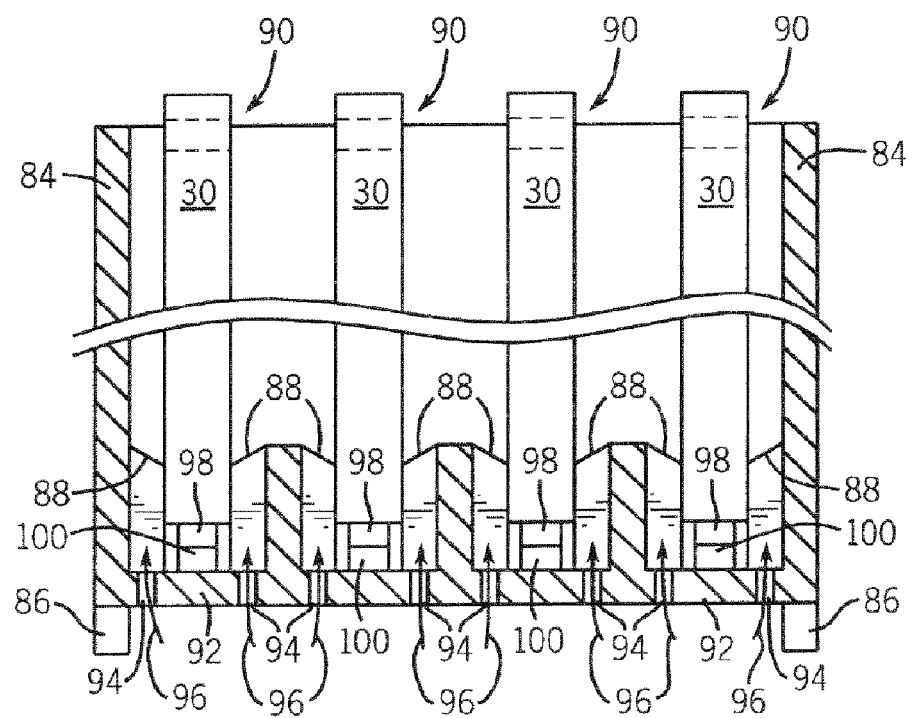
FIG. 9 is a cross-sectional view of the x-ray detector docking station of FIG. 8 taken along lines 9-9 thereof and illustrating one embodiment of regulating the temperature of a stored x-ray detector in accordance with the present invention.

As illustrated in FIG. 8, the base 92 of the docking station 84 includes a plurality of bores 94 that permit the ingress of cooling or heating fluid, such as ambient air, into the docking station. Referring now to FIG. 9, bores 94 extend through the base 92 of the docking station 84 and, as such, define a plurality of thermal exchange paths 96. Exchange paths 96 are designed to allow ambient air to pass through the base 92 and upwardly along the exterior of the stored x-ray detectors 30. As air passes about the x-ray detectors 30, heat is removed from therefrom and the x-ray detectors are brought to a desired temperature. It is also contemplated that cooling or heating elements (not shown) may be placed in the thermal exchange paths 96 to manipulate the temperature of the air passing therethrough to accelerate the thermal regulation of the x-ray detectors. Additionally, the docking station 84 may be mounted to a wall in a conventional manner such that the x-ray detectors 30 are stored parallel to the floor. As a result, natural air flow through paths 96 may be increased to effectuate accelerated heating and/or cooling of the x-ray detectors 30.

Still referring to FIG. 9, as described above, each x-ray detector 30 includes a connector 98 that interfaces with a socket or mating connector 100 secured to the base 92 of the docking station 84. When connected, the docking station 84 can smartly regulate the temperature of an x-ray detector or provide an indication that an x-ray detector has not reached a desired temperature. That is, each x-ray detector 30 may be equipped with a sensor (not shown) that monitors surface as well as internal temperatures. The sensor can then provide feedback to a controller (not shown) in the docking station 84. The docking station controller may then continue to receive feedback from the sensor while the x-ray detector is being thermally regulated. From the feedback, the docking station may ascertain if the x-ray detector has reached a desired temperature and illuminate LEDs (not shown) accordingly. The LEDs may be on the x-ray detector or on the docking station itself. As such, when the x-ray detector has been cooled or heated to a given temperature, or within a desired temperature range, an LED may be illuminated signaling to a user that the x-ray detector is ready to be placed into use.

Conversely, if the temperature of the x-ray detector is outside the desired temperature range, an LED may be illuminate signaling such to a user.

Figure 10:
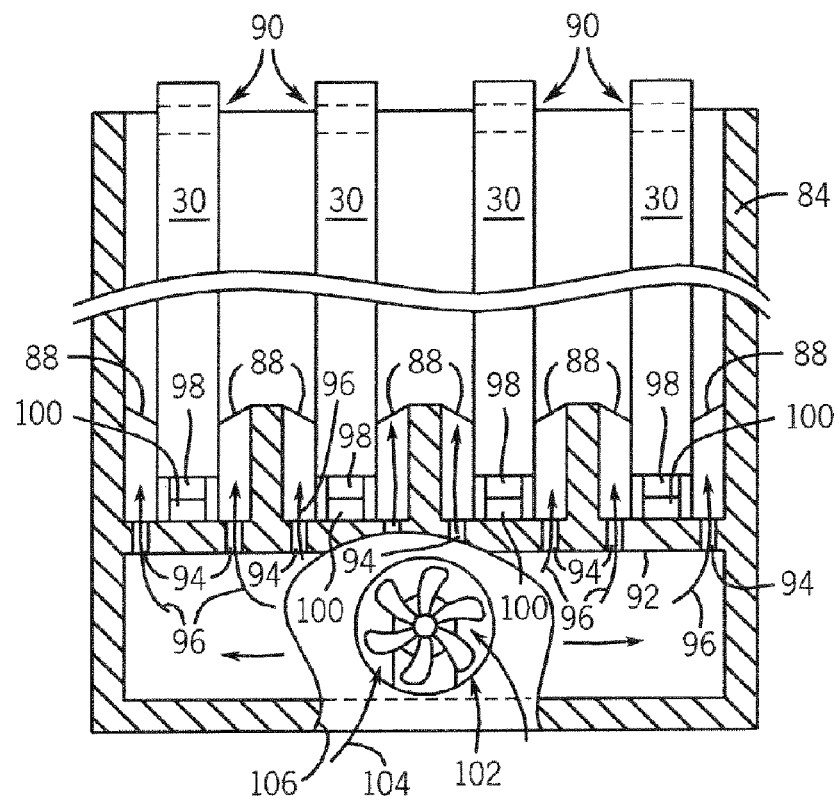
FIG. 10 is a cross-sectional view similar to the view of FIG. 9 illustration another embodiment of regulating the temperature of a stored x-ray detector in accordance with another aspect of the present invention.

The present invention also contemplates the use of a forced air convection to regulate the temperature of stored x-ray detectors. Referring now to FIG. 10, docking 84 may be equipped with a fan assembly 102 designed to draw air from the ambient 104 through opening 106. It is preferred that fan assembly 102 be a variable speed fan. In this regard, feedback received from the thermal sensors in the stored x-ray detectors may be processed by a controller in the docking station and used to control the speed of fan 102. While a single fan 102 is shown to force air collectively through paths 96, it is contemplated that each x-ray detector receptacle 90 may be equipped with a fan. Additionally, it is contemplated that each receptacle may be equipped to include a heating and/or cooling element in paths 96 to expedite the thermal exchange process. Further, docking station 84 is shown without a cover; however, it is contemplated that a cover may be used to seal the x-ray detector within the docking station. In this regard, drawn air may be circulated throughout the docking station. As such, heat from one x-ray detector may be used to heat a cooled x-ray detector, and vice-versa, to achieve temperature equilibrium across the bank of x-ray detectors.

Figure 11:
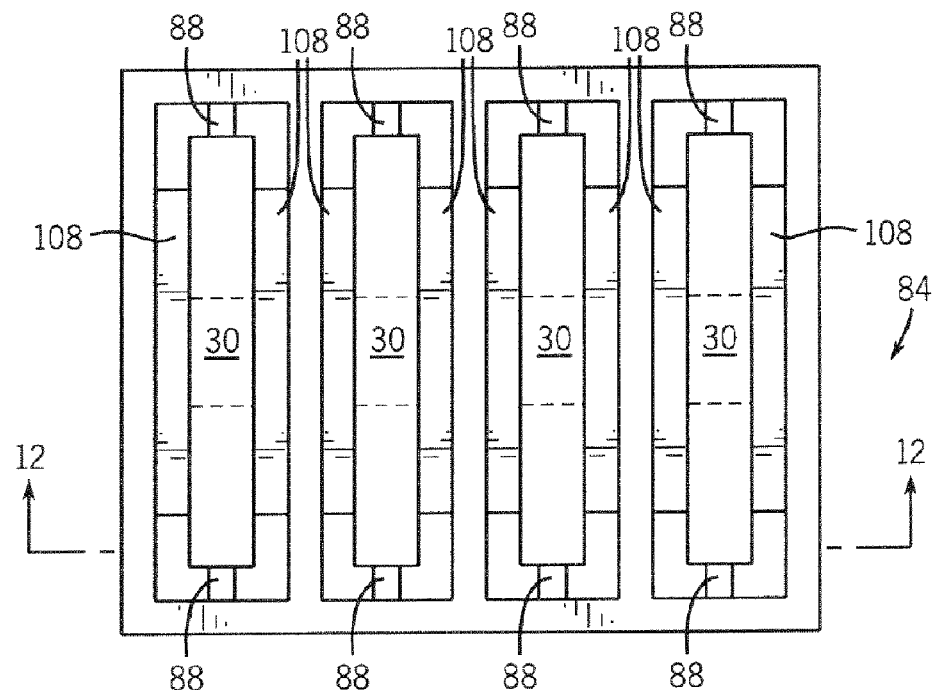
FIG. 11 is a top view of an x-ray detector docking station according to a further embodiment of the present invention.

Referring now to FIG. 11, a top view of docking station in accordance with alternate embodiment of the present invention is shown. In this embodiment, docking station 84 includes ribs 88 and thermoelectric devices 108. The thermoelectric devices 108 may include a Peltier device that be caused to cool as well as a heat an x-ray detector 30. Devices 108 include heat sinks that are in contact with the stored detectors to dissipate heat therefrom. It is contemplated that a single thermoelectric device 108 may be used for each x-ray detector 30 or, as illustrated, a pair of thermoelectric devices 108 for each x-ray detector 30. The thermoelectric modules 108 are also configured to define the boundaries of the storage receptacle to which a detector is to be placed when stored.

Figure 12:
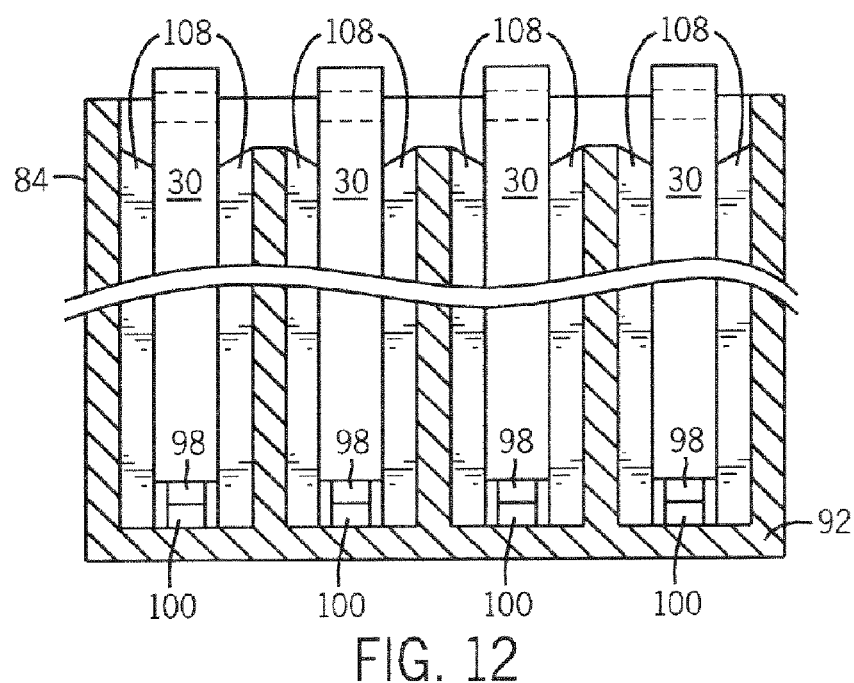
FIG. 12 is a cross-sectional view of the x-ray detector docking station of FIG. 11 taken along lines 12-12 thereof.

A cross-sectional view of FIG. 11 taken along lines 12-12 is shown in FIG. 12 illustrating a height contemplated for each thermoelectric module 108 relative to a stored x-ray detector 30. Preferably, each module 108 is sized to cover at least the template 52 (FIG. 3) on each x-ray detector 30. Similar to the embodiments described above, docking station 84 includes a connector 100 connectable to a mate 98 of each stored x-ray detector to facilitate the communication of temperature data from the x-ray detector to a docking station controller. In this regard, the thermoelectric devices may be dynamically controlled to achieve the desired thermal regulation of each x-ray detector. As is well known, operation of Peltier devices is controlled by the direction of current applied thereto. As such, the docking station controller may selectively bias each thermoelectric device to achieve either a cooling or a heating of a corresponding x-ray detector 30.

Figure 13:
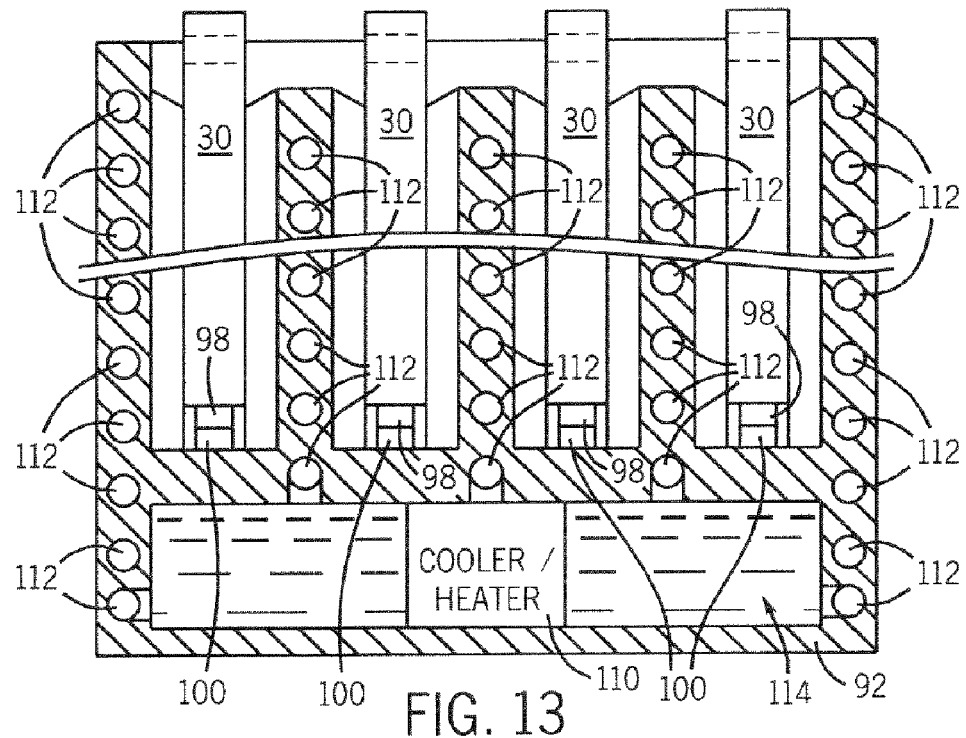
FIG. 13 is a cross-sectional view of an x-ray detector docking station in accordance with another embodiment of the present invention.

Yet another contemplated embodiment is illustrated in FIG. 13. The present invention contemplates the use of thermal exchange fluid that may be circulated by a heater/cooler assembly 110. In this regard, docking station 84 includes a number of fluid paths 112 for circulating fluid, such as liquid coolant, about the stored x-ray detectors 30. One skilled in the art will appreciate that assembly 110 includes a motor and pump assembly to effectuate circulation of fluid from reservoir 114 through paths 112. In this embodiment, it is preferred that coolant be caused to circulate throughout the entire docking station. In this regard, heat from a "hot" x-ray detector may be used to heat the coolant passing thereabout and this heat may then be transferred to a "cold" x-ray detector or deposited in reservoir to assist in maintaining a relatively constant reservoir temperature. It also contemplated that assembly 110 may include a chiller or heater for cooling or heating the thermal exchange fluid directly. Operation of the assembly 110 may be controlled from feedback data received from temperature sensors in the stored x-ray detectors via interfaces 98-100.

Figure 14:
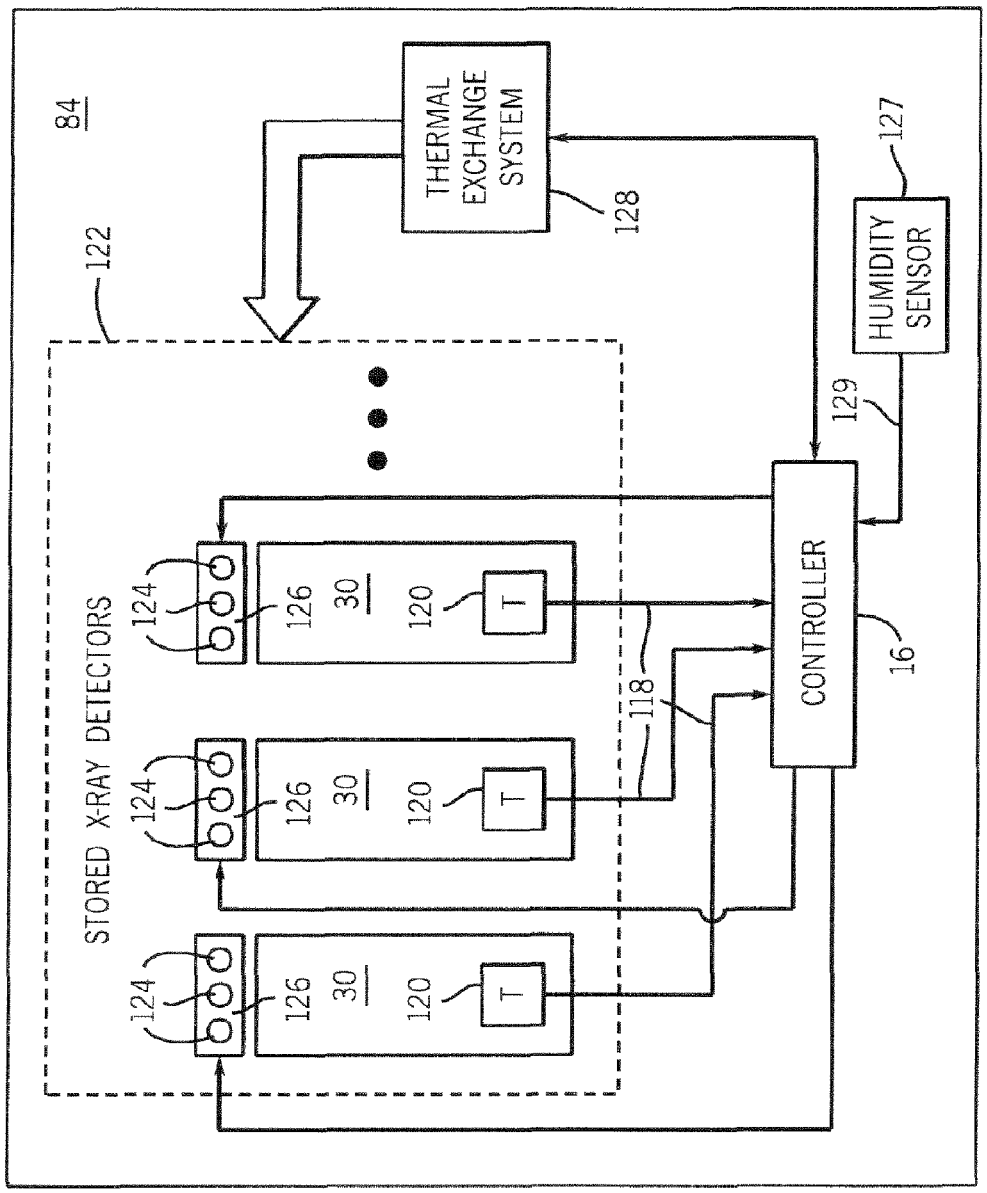
FIG. 14 is a schematic block diagram of a thermal regulating docking station in accordance with one aspect of the present invention.

Referring now to FIG. 14, a block diagram schematically illustrates operation of the docking stations described above. Docking station 84 includes a controller 116 that is configured to receive feedback 118 from temperature sensors 120 of each stored x-ray detector 30 of detector bank 122. From the feedback received from each detector 30, controller illuminates an LED 124 of an LED bank 126 for each stored x-ray detector 30. The LED bank 126 may be disposed on the x-ray detector 30 or on the docking station itself. In one contemplated embodiment, the controller illuminates a "green" LED if the x-ray detector is within a desired range, a "yellow" LED if the x-ray detector is outside the desired range but within a usable range, and "red" LED if the x-ray detector has a temperature that can significantly impact the operability of the detector or exceeds a maximum allowable temperature for usage. One skilled in the art will appreciate that other indicators and indication methods may be used. Additionally, the docking station may include a humidity sensor 127 that monitors the relative humidity of the ambient and provides feedback 129 to the controller 116.

From feedback 118, 129, controller 116 regulates operation of thermal exchange system 128. For instance, for a docking station incorporating a fan, the speed of the fan may be adjusted. For a docking station having thermoelectric devices, the bias applied to each thermoelectric device may be adjusted. For a docking station designed to circulate coolant, coolant flow may be adjusted. For a docking station having a compressor for passing compressed air around the stored detector, the controller may adjust operation of the compressor based on the temperature of the stored x-ray detector. In short, controller 116 regulates the thermal exchange system such that the temperature of the stored x-ray detector is quickly brought to within a desired temperature range, i.e., reduces the difference between a measured x-ray detector temperature and a desired temperature. Further, the controller is programmed to compare the temperature of the stored x-ray detector to the desired temperature and, from the comparison, determine a rate of temperature adjustment needed to bring the temperature of the stored x-ray detector to the desired temperature without placing thermal stress on internal components of the stored x-ray detector. Moreover, it is preferred that controller 116 regulate the thermal exchange system 128 such that the relative humidity is taken into account so that condensation on the stored x-ray detectors and docking station components is prevented. In this regard, the "down-time" of a cooling x-ray detector or the "warm-up time" of a cold x-ray detector is reduced. Decreasing down-time and warm-up time effectively increases the operability of an x-ray detector which leads to increased patient throughput and reduced x-ray detector supply needs.

It is contemplated that docking station 84 may be a free standing device, wall mounted, or incorporated into an x-ray scanner. In this regard, a fixed or stationary as well as a mobile x-ray scanner may have a dedicated docking station for storage as well as thermal regulation of an x-ray detector. It is also contemplated that the docking station may be a mobile apparatus and, as such, incorporates wheeled legs. Additionally, the docking station may include a battery to power its electronic components when connection to a utility power source is not feasible. Moreover, the docking stations described above were shown with respect to similarly sized x-ray detectors; however, it is contemplated that the docking station may be designed to store and thermally regulate various sized x-ray detectors. Additionally, as described above, the docking stations are designed to communicate with a stored x-ray detector. It is contemplated that that the same connector used to connect the x-ray detector to the x-ray scanner may be used to interface with the docking station. This connection may be across a serial or a parallel connection, for example, USB, IEEE 1394, and Ethernet. It is also contemplated that temperature data may be communicated from an x-ray detector to the docking station across a wireless connection. In this regard, the docking station may include antennas, receivers, and other operational circuitry to support the wireless transference and processing of data.

Additionally, the docking station may be configured to charge or recharge batteries or energy storage devices of a stored detector using one of a number of techniques, such as direct electrical contact or induction. In this regard, the receptacle for an x-ray detector may have spring-loaded contacts or some other method of continuous electrical connection to the x-ray detector, such that an electrical connection could be made for charging. Induction may be also used to avoid exposed leads. While induction may add heat to a stored x-ray detector, the environmental controls of the docking station described herein would be capable of maintaining the temperature of a stored x-ray detector within prescribed limits, notwithstanding the additional heat from induction charging. Charging of a battery in an x-ray detector may also be achieved via the interface described above connecting an x-ray detector to the docking station.

Therefore, the present invention includes an x-ray detector storage device having a storage bin sized to store at least one x-ray detector. The storage device also has a temperature regulator configured to adjust a temperature of a stored x-ray detector to a desired temperature.

An x-ray detector storage apparatus is presented and includes a receptacle sized to receive an x-ray detector during non-use of the x-ray detector. The apparatus also has a temperature control interface connected to the receptacle and configured to provide feedback as to a temperature of an x-ray detector when the x-ray detector is disposed within the receptacle. A thermal exchange system is configured to regulate the temperature of an x-ray detector when the x-ray detector is disposed within the receptacle. The apparatus further includes a controller operationally connected to receive the feedback and control the thermal exchange system to reduce a difference between the temperature of an x-ray detector disposed in the receptacle and a desired temperature.

The present invention includes an x-ray detector docking station having a storage bin sized to receive one or more flat panel x-ray detectors and an interface configured to receive temperature data from a flat panel x-ray detector disposed in the storage bin. The docking station further includes means for regulating a temperature of the flat panel x-ray detector based on temperature data received from the interface.

The present invention has been described in terms of the preferred embodiment, and it is recognized that equivalents, alternatives, and modifications, aside from those expressly stated, are possible and within the scope of the appending claims.

What is claimed is:

1. An x-ray detector storage device comprising:
   a storage bin sized to store at least one x-ray detector; and
   a temperature regulator configured to adjust a temperature of a stored x-ray detector to a desired temperature; and
   wherein the at least one x-ray detector is detached from an x-ray scanner.

2. The x-ray detector storage device of claim 1 wherein the storage bin is remote from an x-ray scanner.

3. The x-ray detector storage device of claim 1 wherein the storage bin includes a data port to interface with a stored x-ray detector and route temperature data of the stored x-ray detector to the temperature regulator.

4. The x-ray detector storage device of claim 1 wherein the temperature regulator is configured to effectuate an increase or a decrease in the temperature of the stored x-ray detector to adjust the temperature of the x-ray detector to the desired temperature.

5. The x-ray detector storage device of claim 1 wherein the temperature regulator includes a controller configured to compare the temperature of the stored x-ray detector to the desired temperature and, from the comparison, determine a rate of temperature adjustment needed to bring the temperature of the stored x-ray detector to the desired temperature without placing thermal stress on internal components of the stored x-ray detector.

6. The x-ray detector storage device of claim 1 wherein the temperature regulator includes a thermo-electric cooling device to adjust the temperature of the stored x-ray detector.

7. The x-ray detector storage device of claim 6 wherein the thermo-electric cooling device is a Peltier device.

8. The x-ray detector storage device of claim 1 wherein the temperature regulator includes a compressor for passing compressed air about one or more outer surfaces of the stored x-ray detector.

9. The x-ray detector storage device of claim 1 wherein the temperature regulator includes a closed coolant circuit and a coolant source designed to circulate coolant about the stored x-ray detector.

10. The x-ray detector storage device of claim 1 wherein the temperature regulator includes one or more fans.

11. The x-ray detector storage device of claim 10 wherein the one or more fans is variable speed controllable.

12. The x-ray detector storage device of claim 1 wherein the temperature regulator includes a heat sink constructed to engage a heated surface of the stored x-ray detector.

13. The x-ray detector storage device of claim 1 wherein the storage bin is configured to store multiple x-ray detectors and wherein the temperature regulator is configured to independently adjust a temperature of the multiple x-ray detectors.

14. The x-ray detector storage device of claim 1 further comprising an LED constructed to provide a visual indication that a stored x-ray detector has a temperature substantially equivalent to the desired temperature.

15. An x-ray detector storage apparatus comprising:
   a receptacle sized to receive an x-ray detector during non-use of the x-ray detector;
   a temperature control interface connected to the receptacle and configured to provide feedback as to a temperature of an x-ray detector when the x-ray detector is disposed within the receptacle;
   a thermal exchange system configured to regulate the temperature of an x-ray detector when the x-ray detector is disposed within the receptacle; and
   a controller operationally connected to receive the feedback and control the thermal exchange system to reduce a difference between the temperature of an x-ray detector disposed in the receptacle and a desired temperature.

16. The apparatus of claim 15 wherein the thermal exchange system is configured to regulate thermal exchange with an x-ray detector using at least one of convection, conduction, and radiation.

17. The apparatus of claim 16 wherein the thermal exchange system includes one of a forced air exchange, a cold plate, a heat sink, and a thermo-electric cooling device.

18. The apparatus of claim 15 wherein the controller is further configured to control the thermal exchange system to transfer heat to the x-ray detector if the temperature of the x-ray detector is less than a desired temperature for data acquisition and remove heat from the x-ray detector if the temperature of the x-ray detector exceeds a desired temperature for data acquisition.

19. The apparatus of claim 15 configured to be remote from an x-ray scanner.

20. The apparatus of claim 15 further comprising a proximity sensor electronically connected to the controller and configured to provide feedback to the controller as to whether an x-ray detector is disposed in the receptacle.

21. The apparatus of claim 20 wherein the controller is further configured to repeatedly acquire temperature data from an x-ray detector deemed present in the receptacle.

22. The apparatus of claim 15 wherein the receptacle is further configured to receive a plurality of x-ray detectors.

23. The apparatus of claim 15 wherein the receptacle is sized to receive a flat panel, solid state x-ray detector.

24. An x-ray detector docking station comprising:
a storage bin sized to receive one or more flat panel x-ray detectors;
an interface configured to receive temperature data from a flat panel x-ray detector disposed in the storage bin; and
means for regulating a temperature of the flat panel x-ray detector based on temperature data received from the interface.

25. The x-ray detector docking station of claim 24 further comprising means for charging a battery of a stored flat panel x-ray detector.

26. An x-ray detector storage device comprising:
a storage bin sized to store at least one x-ray detector, wherein the storage bin is remote from an x-ray scanner; and
a temperature regulator configured to adjust a temperature of a stored x-ray detector to a desired temperature.

* * * * *